United States Patent Office

2,872,479
Patented Feb. 3, 1959

2,872,479

PREPARATION OF ORGANOBORON COMPOUNDS

Robert L. Letsinger, Wilmette, Ill., Ivan H. Skoog, St. Paul, Minn., and Nathaniel L. Remes, Crystal Lake, Ill., assignors to Callery Chemical Company, Pittsburgh, Pa., a corporation of Pennsylvania No Drawing. Application June 30, 1955
Serial No. 519,235

10 Claims. (Cl. 260—500)

This invention relates to a new and improved method for the preparation of dialkyl and diarylhydroxyboranes (having the general formula $R_2BOH$ where R is an alkyl or aryl group) sometimes referred to as dialkyl or diaryl borinic acids. In particular, it relates to a new and useful method for isolating and characterizing these organoboron compounds in the form of a substituted ethanol derivative.

Although good methods are available for the preparation of alkyl and aryl dihydroxyboranes, $RB(OH)_2$, sometimes referred to as alkyl or arylboronic acids no satisfactory procedures for preparing dialkyl and diarylhydroxyboranes, $R_2BOH$, have been described. Several of these compounds, especially the diarylhydroxyboranes, have been reported but the isolation procedures were poor, the yields were not specified, and in the case of diphenylhydroxyborane there was a marked divergence in the properties reported. Thus, Michaelis et al. in Ber. 27, 244 (1894) claimed that diphenylhydroxyborane melted at 265° C. while Konig et al. in J. Prakt. Chem. 128, 153 (1930) reported a melting point of 57.5° C. and a boiling point of 150° C. at 200 mm. for the same compound. Two problems of interest in the chemistry of these organoboron compounds are (1) the development of practical procedures for isolating and characterizing both dialkyl and diarylhydroxyboranes and (2) the synthesis of a stable organoboron compound with two different organic groups attached to the boron atom. Further research has culminated in the successful solution of these problems.

It is an object of this invention to provide a new and improved method for preparing both dialkyl and diarylhydroxyboranes.

Another object is to provide a new and useful method for isolating and characterizing dialkyl and diarylhydroxyboranes.

A still further object is to provide a method for preparing a stable organoboron compound with two different organic groups attached to the boron atom.

A further object is to prepare several new and useful organoboron compounds and establish their physical properties.

Other objects will become apparent throughout the following specification and appended claims.

This new and improved method for preparing organoboron compounds will be more fully described hereinafter and the novelty thereof will be particularly pointed out and distinctly claimed.

This invention is based upon the discovery that both dialkyl and diarylhydroxyboranes can be definitely characterized by reaction with ethanolamine or ethylene glycol to form a substituted ethanol derivative which in turn can be hydrolyzed with acid to yield pure dialkyl and diarylhydroxyboranes.

In one experiment, diphenylhydroxyborane, $(C_6H_5)_2BOH$ was prepared and characterized as follows: a solution of phenylmagnesium bromide (1.2 M, 475 ml.) was slowly added with stirring to 60.2 g. (0.284 mol) of triisobutoxyborane in 150 ml. of ether at room temperature using a nitrogen atmosphere. The ether solvent refluxed gently during the one hour addition period. The mixture was stirred for another 2 hours and heated to maintain a refluxing temperature. This mixture was then hydrolyzed with 200 ml. of 3.6 M HCl and the ether layer washed with water and dried over calcium sulfate. Distillation at a temperature of 150°–155° C. at 15 mm. yielded 0.62 g. of diphenyl with a melting point of 67°–68° C. which solidified in the condenser, a main liquid fraction with a boiling point of 150°–205° C. at 15 mm. which weighed 26.5 g. and a solid identified as triphenylborane which remained as a residue. The liquid fraction was diluted with an equal volume of ether and saturated with ammonia. A heavy white precipitate formed which was ammonia-diphenylisobutoxyborane. The weight was 16.9 g. or 23% of theory. The melting point was 64–67° C. with evolution of ammonia. Analysis was as follows: calculated for $C_{16}H_{22}ONB$, C=75.4%, H=8.67%; found—C=74.65%, H=8.44%. A mixture of 2.13 g. of the ammonia complex with 2 ml. of ethanolamine and 100 ml. of toluene was heated until toluene and its azeotropes were distilled leaving a volume of 10 ml. On cooling, 1.67 g. of diphenyl-(2-aminoethoxy) borane crystallized out which represented 89% of theory. The melting point was 187°–188° C. The same product can also be prepared by direct precipitation from an alcohol-water mixture. Thus, a solution of 13.7 g. of the ammonia complex in 100 ml. of ethanol and 200 ml. of water, when mixed with 6 ml. of ethanolamine in 6 ml. of water yielded 10.97 g. (91% of theory) of diphenyl-(2-aminoethoxy) borane which was recrystallized from alcohol and water. The melting point was 189°–190° C. Chemical analysis and an equivalent weight determination was as follows:

|  | $C_{14}H_{16}ONB$ | |
|---|---|---|
|  | Calculated | Found |
| Percent B | 4.80 | 4.79 |
| Percent C | 74.70 | 74.02 |
| Percent H | 7.16 | 7.11 |
| Percent N | 6.23 | 6.47 |
| Eq. Wt | 225.1 | 225.0 |

A solution of 5.33 g. of diphenyl-(2-aminoethoxy) borane in methanol and acetone was acidified with HCl. Enough water was added to cause a separation of layers and the diphenylhydroxyborane was extracted with ether, dried over magnesium sulfate and vacuum distilled. The distillate weighing 2.11 g. (boiling point 210°–213° C. at 1 mm.) solidified on standing. The melting point was 104°–105° C. This solid was the anhydride, bis-(diphenylboryl) oxide, which formed an oil when added to water. It therefore appears that neither Michaelis' compound which melted at 264° C. nor Konig's compound which boiled at 150° C. at 200 mm. and melted at 57.5° C. could possibly have been diphenylhydroxyborane.

Another method for preparing diphenylhydroxyborane in better yield was as follows: an ether solution of 948 ml. of 1.94 M phenylmagnesium bromide (1.84 mols) was slowly added to 113 g. (0.92 mol) of 4,5 dihydro-2-butoxy-2-bora-1,3-dioxole,

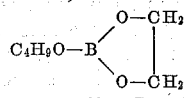

in 2 liters of ether at −60° C. After standing overnight at room temperature the reaction mixture was hydrolyzed with 600 ml. of 3.4 N HCl. The ether layer was washed, dried, and separated into equal portions. One portion was mixed with 20 ml. of n-butyl alcohol and 800 ml. of toluene and diphenylbutoxyborane was distilled off under vacuum. The fraction boiling between 124°–160° C. at 2 mm. weighed 68 g. This fraction was diluted with an equal volume of ether and saturated with ammonia. The yield of ammonia diphenylbutoxyborane was 57 g. (48.5% of theory). A portion of this was converted into the ethanolamine derivative of diphenylhydroxyborane in 81% yield using the procedure described in the first example. Acid hydrolysis produced the free diphenylhydroxyborane as an oil which could not be crystallized.

It can readily be seen from the foregoing examples that although the ammonia complex was useful in separating the desired product, it was not a satisfactory derivative for characterization purposes since it did not melt sharply, could not be recrystallized easily and gradually decomposed. It could, however, be converted in 80–90% yields to diphenyl-(2-aminoethoxy) borane by the action of ethanolamine in ether-toluene or an ethanol-water solution. This proved to be an excellent derivative as it was easily prepared, could be recrystallized from organic solvents or water, had a sharp melting point, analyzed well and showed no signs of decomposition. On hydrolysis with dilute HCl, it yielded the free diphenylhydroxyborane as an oil which did not crystallize.

In another experiment, di-1-naphthylhydroxyborane was prepared as follows: 207 g. (1.0 mol) of naphthyl bromide in 350 ml. of ether was added to 29.2 g. (1.2 g. atoms) of magnesium in 500 ml. of ether at a rate so as to maintain a gentle reflux. During the addition, some of the Grignard reagent precipitated. It was dissolved by the addition of 300 ml. of benzene. The resulting clear brown solution was then added over a 5-hour period to 125 g. (0.5 mol) of tributoxyborane in 300 ml. of ether at −60° C. After the mixture had stood overnight it was hydrolyzed with 10% sulfuric acid, the organic layer separated and mixed with external cooling with 42.7 g. of ethanolamine. The resulting precipitate which was di-1-naphthyl-(2-aminoethoxy) borane was washed with 200 ml. of a warm 50% water-ethanol mixture. The weight was 94.5 g. or 58% of theory. The melting point was 205–206° C. Further purification from alcohol and water did not increase the melting point. Analysis of the product was as follows:

|  | $C_{22}H_{20}ONB$ | |
| --- | --- | --- |
|  | Calculated | Found |
| Percent B | 3.33 | 3.30 |
| Neut. Eq | 325 | 328 |

The di-1-naphthyl-(2-aminoethoxy) borane was hydrolyzed by warming it with 50% methanol-water acidified with HCl. When the mixture was poured into ice water a white solid separated which after recrystallization and drying over 65% sulfuric acid melted at 105°–106° C. This solid was dinaphthylhydroxyborane. The neutralization equivalent was determined by titration with alkali in the presence of mannitol: Found—290; calculated—282. The dinaphthylhydroxyborane was reconverted to the aminoethoxy derivative with ethanolamine in alcohol-water in 74% yield.

In another experiment, phenyl-1-naphthylhydroxyborane was prepared as follows: 0.05 mole of 1-naphthylmagnesium bromide in 20 ml. of ether and 3 ml. of benzene was added dropwise to a cold solution (−60° C.) of 11.7 g. (0.05 mol) of phenyldibutoxyborane in 100 ml. of ether. After the mixture had stood overnight at room temperature, it was hydrolyzed with dilute HCl.

The ether layer was separated and the ether evaporated. To the residue was added 125 ml. of ethanol, 20 ml. of water and 6 ml. of ethanolamine. The white precipitate formed was phenyl-1-naphthyl-(2-aminoethoxy) borane which weighed 10.1 g. (75% of theory) and melted at 226–228° C. After recrystallization from acetone-water, the melting point was 228–229° C. Chemical analysis was as follows:

|  | $C_{18}H_{18}ONB$ | |
| --- | --- | --- |
|  | Calculated | Found |
| Percent B | 3.93 | 3.93 |
| Neut. Eq | 275 | 275 |

The structure of this compound was established not only by the analysis and method of synthesis but also by the isolation of 1-naphthol, naphthalene, and benzoic acid from cleavage reactions with hydrogen peroxide, zinc chloride and bromine. On acid hydrolysis, it yielded a liquid, phenyl-1-naphthylhydroxyborane.

In another experiment, dibutylhydroxyborane was prepared as follows: an ether solution containing 1.23 mols of butylmagnesium bromide was added to 91.6 g. (0.636 mol) of 4,5-dihydro-2-butoxy-2-bora-1,3-dioxole in 1.6 liters of ether at −60° C. over a four hour period. A white precipitate formed immediately and became quite thick before completion of the reaction. The resulting mixture was hydrolyzed with 400 ml. of 3 M HCl. The ether layer was separated and to it was added 34 ml. (.63 mol) of ethylene glycol and one liter of toluene. After removal of the toluene and its azeotropes by distillation, the residue was fractionated through a 25 cm. helices-packed column. The principal fraction boiled between 133°–134° C. at 1 mm. and weighed 45.4 g. (47.4% of theory). This was identified by analysis as 1,2-bis-(dibutylboryloxy)-ethane,

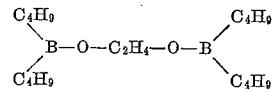

Calculated for $C_{18}H_{40}O_2B_2$: C=69.70%; H=13.00%; equivalent weight=155. Found: C=69.83%; H=12.91%; equivalent weight=156. The 1,2-bis-(dibutylboryloxy)-ethane was hydrolyzed by treatment with 1.87 N sodium hydroxide. A clear homogeneous solution resulted to which was added 300 ml. of ether. The solution was acidified and the ether layer separated. After drying over calcium sulfate, the ether was distilled leaving the dibutylhydroxyborane as an oil. The oil was dehydrated by adding toluene and distilling under reduced pressure. The fraction boiling at 102° C. at 1 mm. was identified as bis(dibutylboryl) oxide, $$(C_4H_9)_2BOB(C_4H_9)_2$$

Calculated for $C_{16}H_{36}B_2O$: C=72.22%; H=13.63%; equivalent weight=133. Found: C=71.92%; H=13.58%; equivalent weight=139.

In a similar experiment, diisopentylhydroxyborane was prepared as follows: 0.90 mol of isopentylmagnesium bromide in 735 ml. of ether was added slowly over a 3-hour period to 65.6 g. (0.46 mol) of 4,5-dihydro-2-butoxy-2-bora-1,3-dioxole,

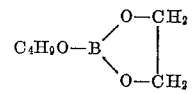

in 300 ml. of ether at −60° C. After standing overnight, the mixture was hydrolyzed, the ether layer separated and treated with ethylene glycol as in the previous example. Upon distillation at reduced pressure, the main fraction boiled at 147°–148° C. at 0.5 mm. and weighed 36.8 g. (45% of theory). This was identified by analysis as 1,2-bis-(diisopentylboryloxy)-ethane,

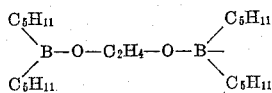

Calculated for $C_{22}H_{48}O_2B_2$: C=72.14%; H=13.21%; equivalent weight=183. Found: C=72.06%; H=12.72%; equivalent weight=181. Upon hydrolysis of this compound with NaOH and HCl in ether solution, the diisopentylhydroxyborane was obtained as an oil.

It should be noted that when dialkylhydroxyboranes are prepared by the reaction of a Grignard reagent with a cyclic boron compound, such as 4,5-dihydro-2-butoxy-2-bora-1,3-dioxole, a yield of the order of three to four times greater is obtained than when the corresponding trialkoxyborane is reacted with a Grignard reagent.

The compounds described herein are useful as intermediates in the preparation of dialkyl and diarylalkoxyboranes which are useful additives in lubricating oil to stabilize the oil for high pressure operations. The dialkyl and diarylalkoxyboranes are also useful in stabilizing hydrocarbon oils to prevent the formation of corrosive oxidation products and other sludge forming compounds.

Having thus described this invention fully and completely as required by the patent laws, it will be obvious to those skilled in the art that other modifications are possible. It should therefore be understood that within the scope of the appended claims this invention may be practiced otherwise than as specifically described.

What is claimed and desired to be secured by Letters Patent of the United States is:

1. A method of preparing organoboron compounds of the group consisting of dialkylhydroxyboranes and diarylhydroxyboranes having the general formula $R_2BOH$ in which R is at least one member selected from the group consisting of alkyl and aryl which comprises treating a member selected from the group consisting of alkyl and aryl Grignard reagents with a boron-containing compound selected from the group consisting of trialkoxyboranes, 4,5-dihydro-2-alkoxy-2-bora-1,3-dioxoles and aryldialkoxyboranes where all alkoxy groups in any of said compounds are identical to one another, subjecting the resulting mixture to hydrolysis and then treating it with a member of the group consisting of ethylene glycol and ethanolamine to form an ethylene derivative, then subjecting the resultant derivative to hydrolysis and recovering the resulting organoboron compound.

2. A method according to claim 1 in which said Grignard reagent and said alkoxyborane are contacted at −60° C.

3. A method according to claim 1 in which the Grignard reagent is phenyl magnesium bromide, and the organoboron compound recovered is diphenylhydroxyborane.

4. A method according to claim 1 in which the Grignard reagent is 1-naphthyl magnesium bromide, said boron-containing compound is tributoxyborane and the diarylhydroxyborane recovered is di-1-naphthylhydroxyborane.

5. A method according to claim 1 in which the Grignard reagent is 1-naphthyl magnesium bromide, said boron-containing compound is phenyldibutoxyborane and the diarylhydroxyborane recovered is phenyl-1-naphthylhydroxyborane.

6. A method according to claim 1 in which the Grignard reagent is butyl magnesium bromide, said boron-containing compound is 4,5-dihydro-2-butoxy-2-bora-1,3-dioxole and the dialkylhydroxyborane recovered is dibutylhydroxyborane.

7. A method according to claim 1 in which the Grignard reagent is isopentyl magnesium bromide, said boron-containing compound is 4,5-dihydro-2-butoxy-2-bora-1,3-dioxole and the dialkylhydroxyborane recovered is diisopentylhydroxyborane.

8. The compound phenyl-1-naphthylhydroxyborane which reacts with ethanolamine to form a white solid melting at 228–229° C. said solid having the empirical formula $C_{18}H_{18}ONB$.

9. A method for preparing diphenylhydroxyborane which comprises contacting an ether solution of phenylmagnesium bromide with an ether solution of 4,5-dihydro-2-butoxy-2-bora-1,3-dioxole at −60° C., subjecting the resultant mixture to hydrolysis with aqueous HCl at room temperature, separating the ether layer and contacting said layer with butyl alcohol in toluene, separating the diphenylbutoxyborane thus formed by distillation, diluting said distillate with ether and saturating with ammonia to form an ammonia complex, heating said complex with ethanolamine and toluene, distilling to remove the toluene and cooling to recover diphenyl-(2-aminoethoxy) borane, then subjecting said ethanolamine derivative to hydrolysis and recovering the diphenylhydroxyborane thus formed.

10. A method of preparing organoboron compounds of the group consisting of dialkylhydroxyboranes and diarylhydroxyboranes having the general formula $R_2BOH$ in which R is at least one member selected from the group consisting of alkyl and aryl groups which comprises contacting a member selected from the group consisting of alkyl and aryl Grignard reagents with a 4,5-dihydro-2-alkoxy-2-bora-1,3-dioxole, subjecting the resultant product to hydrolysis, and recovering the organoboron compound thus formed.

References Cited in the file of this patent

Konig et al.: J. Prakt. Chem., vol. 128, pp. 166 to 167.

Kharasch et al.: "Grignard Reactions of Non-metallic Substances," Prentice-Hall, Inc., New York (1954,), p 38.